Jan. 25, 1955     A. G. BADE     2,700,311
COUNTERROTATING DRIVE
Filed Nov. 25, 1949

Inventor
ALFRED G. BADE
Miles Henninger
Attorney

United States Patent Office 2,700,311
Patented Jan. 25, 1955

2,700,311

COUNTERROTATING DRIVE

Alfred G. Bade, Milwaukee, Wis., assignor to The Falk Corporation, Milwaukee, Wis., a corporation of Wisconsin Application November 25, 1949, Serial No. 129,487

3 Claims. (Cl. 74—674)

This invention relates to geared power transmissions of the planetary type which are to be employed for driving a pair of shafts in opposite directions of rotation.

Various types of aircraft now employ counter-rotating propellers to eliminate reaction of the propeller rotation on the aircraft, which otherwise is a material factor in operation of such aircraft. It is desired to provide gear trains which will divide the input power equally between the two propellers, and under all conditions of operation. The transmission should be light and as simple as possible with high durability and should be of as high reliability as possible, and the construction should preferably provide for coaxial positioning of the input and output shafts or so-called "in line" construction.

It is, therefore, one object of the present invention to provide a planetary gear power transmission for equally dividing the power transmitted between an input shaft and two output shafts rotating in opposite directions.

Another object of the invention is to provide gearing in which a multiplicity of planetary gear trains receive power from a single input shaft and in which the several gear trains are so related as to cooperate in driving a number of output shafts.

Another object of the invention is to provide gear transmissions including a pair of planetary gear systems in which the sun gears may severally float radially but are so inter-connected as to receive power from a single input shaft, and in which the gear trains deliver power equally to two concentric shafts rotating in opposite directions.

A further object of the invention is to provide gearing supplying equal amounts of power at all times to two concentric counter-rotating shafts and utilizing two planetary gear trains in which the sun gears are a portion of a full floating unit equalizing the tooth reactions of the sun and planet gears.

And a further object of the invention is to provide a power transmission in which the planetary gear trains include floating reaction gears which automatically assume positions equalizing the tooth reactions between the planet portions engaging with the reaction gears and such reaction gears.

Figure 1:
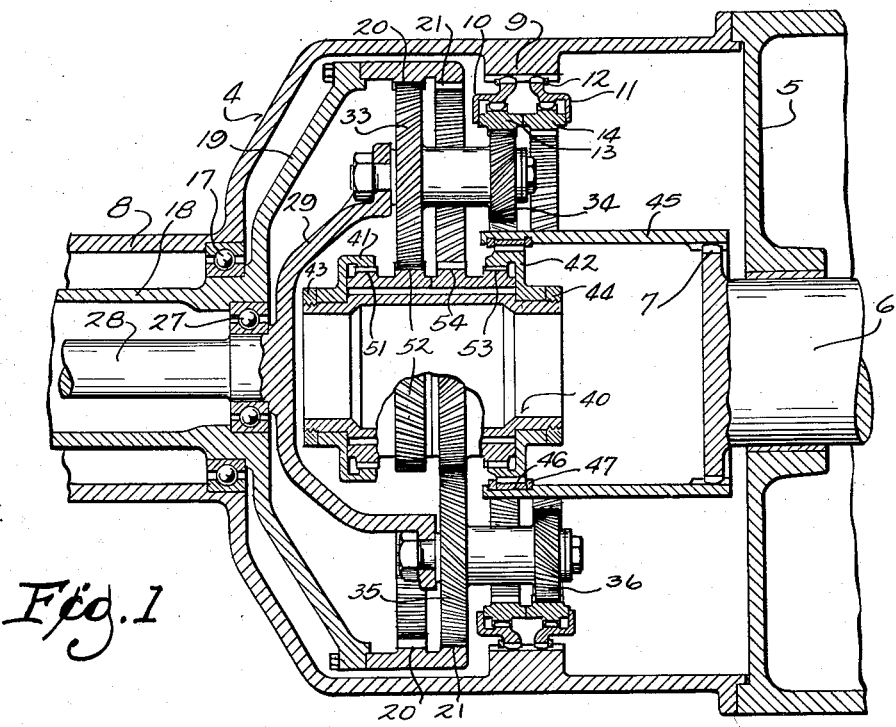
Figure 2:
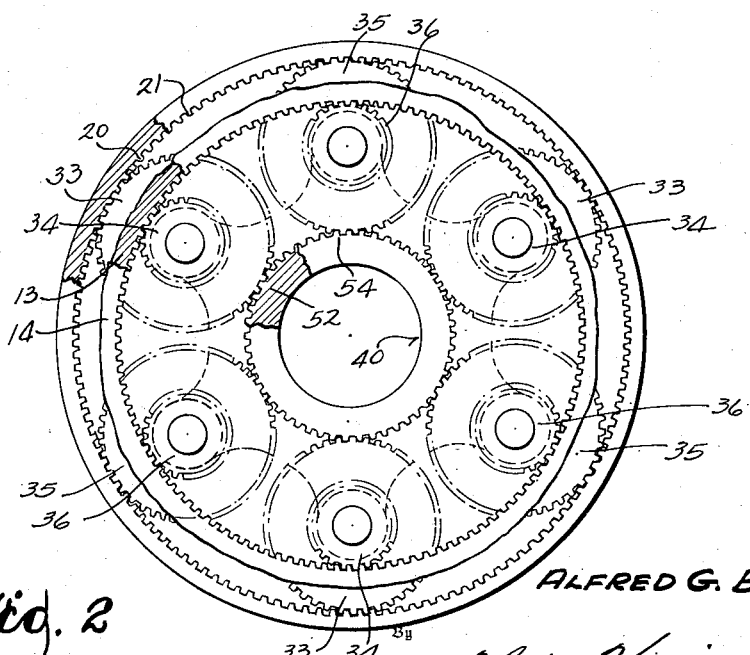

Objects and advantages other than those above set forth, will be apparent from the following description when read in connection with the accompanying drawing, in which:

Fig. 1 is a longitudinal sectional view on an axial vertical plane through a transmission embodying the present invention, and showing fragments of the input and output shafts associated therewith; and Fig. 2 is a diagram looking into the transmission from the right hand end of Fig. 1, to show the relationships of the various gears.

Generally, a structure embodying the present invention includes a stationary housing in which are mounted a plurality of ring gears and which rotatably supports a plurality of output shafts to be driven in opposite directions. Two power flow paths are provided between an input shaft and the output shafts and such paths severally comprise planetary gear trains of which the planet gears severally react on the ring gears on the housing. The sun gears of the several trains are mounted on a carrier flexibly coupled with the input shaft and such sun gears are severally movable radially relative to one another and relative to the carrier. The carrier is supported by the sun gears and may move axially as a whole relative to the planet and orbit gears of the several trains. The groups of planet gears of the several gear trains are fixedly connected with one of the output shafts and mesh with orbit gears fixedly connected with the other output shaft. The floating of the carrier and sun gears thereon and the floating of the reaction gears, in coaction with formation of the gears as helical gears of equal angle but opposite hand in the two gear trains and their reaction gears, divide the load equally between the two gear trains. Hence, the present construction is an "in line" drive for contra-rotating output shafts with equal power flow at all times through both gear trains to the output shafts.

Referring to the drawings in which like reference numerals designate like parts, 4 designates a housing which is stationary and which is formed at one end for connection with a portion 5 of an engine block from which a power shaft 6 extends, the end of such shaft being flanged and toothed as indicated at 7. The other end of the gear housing is formed as a tubular extension 8. A flange 9 is formed interiorly of the housing and intermediate the ends thereof, the flange being formed with teeth for engaging external teeth on two connectors or coupling members 10 and 11 which are also internally toothed and which are independent but coact as will appear hereinafter. Coupling members 10 and 11 are held in place by snap rings 12 and receive externally and internally toothed ring gears 13 and 14 in such relation that the gears may shift radially relative to one another and to the coupling members.

The extension tube 8 of the housing receives bearings 17 (only one being shown) in which is mounted a tubular, outer output shaft 18 with a flange 19 at the end thereof within the housing. The flange 19 has fixed thereto an internal ring gear having two sets of teeth 20 and 21. A number of bearings 27 (only one being shown) are mounted in the output shaft 18 for rotatably supporting an inner output shaft 28 which is flanged at the end 29 thereof within the housing. The flange 29 has fixed thereto a plurality of groups of double gears, the gears of each group being designated as 33, 34 and 35, 36. Gear portions 33 engage gear teeth 20, while gear portions 35 engage gear teeth 21 on flange 19 of shaft 18. Gear portions 34 mesh with ring gear 13 mounted in coupling member 10 while gear portions 36 mesh with ring gear 14 mounted in coupling member 11. Groups of gears 33, 34 and 35, 36 thus form the planets of several planetary gear trains of which teeth 20, 21 form the orbit gears.

A tubular member 40 is placed within a circle defined by the gears 33, 34 and 35, 36 and is provided with shoulders adjacent the ends thereof and against which internally toothed dental coupling members 41, 42 are respectively clamped by rings 43, 44. The member 42 also has external teeth for coaction with teeth on a coupling member 45 which coacts with teeth 7 on the input shaft 6 to form a dental coupling therewith. The coupling member 41 engages one set of teeth 51 on an annular gear having a second set of teeth 52 meshing with gear 33 of gears 33, 34 while coupling member 42 meshes with one set of teeth 53 on a gear having a second set of teeth 54 meshing with gear 35 of gears 35, 36.

It will be seen that dental couplings 45, 42, 53 to the tube 40 and dental coupling members 41, 51 from the tube 40 form flexible connections from the drive shaft 6 to the tube. Hence, the tube 40 which carries the several annular gears above described together with such gears forms an articulated unit freely movable axially as a whole while the annular gears are freely movable radially but without tilting relative to the tube and one another. The desired tooth contacts may be thus maintained between the radially movable sun gears and the planet gears severally meshing therewith. Hence, the above unit is full floating while transmitting power through the driving coupling 45 from input shaft 6 to the several output shafts 8 and 18 and neither axial nor radial restraint are imposed on the parts thereof.

A first train of planetary gears is thus formed by the orbit gear 20, the three planet gears 33, 34 and sun gear 51, 52 with the planet teeth 34 reacting on the housing 4 by way of the reaction gear 13 and connector 10. A second train of planetary gearing is formed by the orbit gear 21, the three planet gears 35, 36 and the sun gear 53, 54 with the planet teeth 36 meshing with the reaction gear 14 and connector 11.

To substantially balance the axial thrust in the several planetary trains, the sun gear teeth 52, the planet teeth 33, the orbit gear 20, planet teeth 34 and reaction gear 13 are formed as helical gears with their helix angles in one direction. Sun gear teeth 54, planet teeth 35, orbit teeth 21, planet teeth 36 and reaction gear teeth 14 have helical angles equal to but of opposite hand to those of the first mentioned gears. The axial thrusts which are produced in the planetary gear trains thus tend to balance. The axial thrust imposed on the coupling members 41, 42 by the respective actions of teeth 51 and 53 are in opposite directions and such thrusts are proportional to the torque load on the sun gears. If the thrust on either planet train exceeds that on the other train at any time, the unbalanced thrust causes carrier 40 and the sun gears to shift axially to equalize the load on the two planetary trains.

When the tooth reactions in one of the trains themselves is unbalanced, the sun gear of that train will move radially to equalize the loads on the three planets severally coupled with such sun gear. The reaction gears are also movable radially to balance tooth reactions of the several planets severally engaged therewith. Thus each of the planetary trains automatically assumes one-half of the total torque transmitted while maintaining the desired tooth contacts in both trains, and each planetary gear accordingly transmits one-sixth of the entire torque load. Hence, the power supplied to the output shafts 28, 18 is equal at all times.

The sets of coupling members are also preferably made helical with the same helix angle but of opposite hand to balance thrusts occurring therein. Thus members 41, 51 act in one direction while members 42, 53 act in the opposite direction, and the several sets of teeth in the input dental coupling of member 45 are likewise of the same helix angle but of opposite hand to balance thrusts therein.

It will be understood that both sets of planetary gears act to drive orbit gears 20, 21 and shaft 18 in one direction and that the reaction of the sets of planets 33, 34 and 35, 36 on the shaft 28, drive such shaft in the opposite direction. Hence, any structure such as propellers severally mounted on the output shafts 28, 18 will be rotated in opposite directions. Equalization in the load between the two planetary gear trains as above described, produced by a drive in which the parts are "in line," and contra-rotation of the two output shafts makes the present drive particularly useful for helicopter propellers and similar drives.

Although but one embodiment of the present invention has been illustrated and described, it will be apparent that various changes and modifications may be made therein without departing from the invention as defined in the appended claims.

I claim:

1. In a power transmission for the contra-rotation of a pair of output shafts, a stationary housing, an input shaft extending into the housing, a pair of ring gears mounted in the housing for movement axially and radially thereof, a sun gear carrier connected with the input shaft for movement axially and radially thereof, and a pair of planetary gear systems including gears having helical teeth of equal angle and opposite hand severally reacting on the ring gears for severally operatively connecting the sun gear carrier with the pair of output shafts, the tooth reactions of the several gear systems being severally equalized within the systems and the tooth reactions between the gear systems being equalized whereby equal power flows through the gear systems to the output shafts.

2. In a power transmission for the contra-rotation of a pair of output shafts, a stationary housing, an input shaft extending into the housing, a pair of ring gears mounted in the housing for movement axially and radially thereof, a sun gear carrier connected with the input shaft for movement axially and radially thereof, a pair of sun gears mounted on the carrier for movement radially thereof, a pair of orbit gears connected with one of the output shafts, and groups of planet gears operatively connected with the other of the ouput shafts, the groups of planet gears severally meshing with a ring gear and a sun gear and an orbit gear for providing two separate paths for equal power flow from the input shaft to the pair of output shafts.

3. In a power transmission for the contra-rotation of a pair of output shafts, a stationary housing, an input shaft extending into the housing, a pair of nonrotatable ring gears mounted side-by-side in the housing for movement axially and radially thereof, a sun gear carrier flexibly connected with the input shaft for movement axially and radially thereof, a pair of sun gears mounted side-by-side on the carrier for movement radially thereof, a pair of orbit gears fixed on one of the output shafts, and two groups of planet gears rotatably mounted on the other of the output shafts, each group of planet gears meshing with one ring gear and one sun gear and one orbit gear whereby two separate paths are provided for equalized power flow to both of the output shafts.

References Cited in the file of this patent

UNITED STATES PATENTS

| 1,228,145 | Sundh | May 29, 1917 |
| 1,425,430 | Wikander | Aug. 8, 1922 |
| 1,442,795 | Cook et al. | Jan. 23, 1923 |
| 1,632,123 | Else | June 14, 1927 |
| 1,730,270 | Friedell | Oct. 1, 1929 |
| 1,977,943 | Gianini | Oct. 23, 1934 |
| 2,427,407 | Hill | Sept. 16, 1947 |
| 2,444,363 | Newcomb | June 29, 1948 |
| 2,516,077 | Schmitter | July 18, 1950 |
| 2,555,586 | Falk | June 5, 1951 |
| 2,591,743 | Thompson | Apr. 8, 1952 |
| 2,603,107 | King | July 15, 1952 |

FOREIGN PATENTS

| 541,820 | Great Britiain | Dec. 12, 1941 |
| 879,255 | France | Feb. 18, 1943 |
| 884,176 | France | Aug. 4, 1943 |